Figure 1:
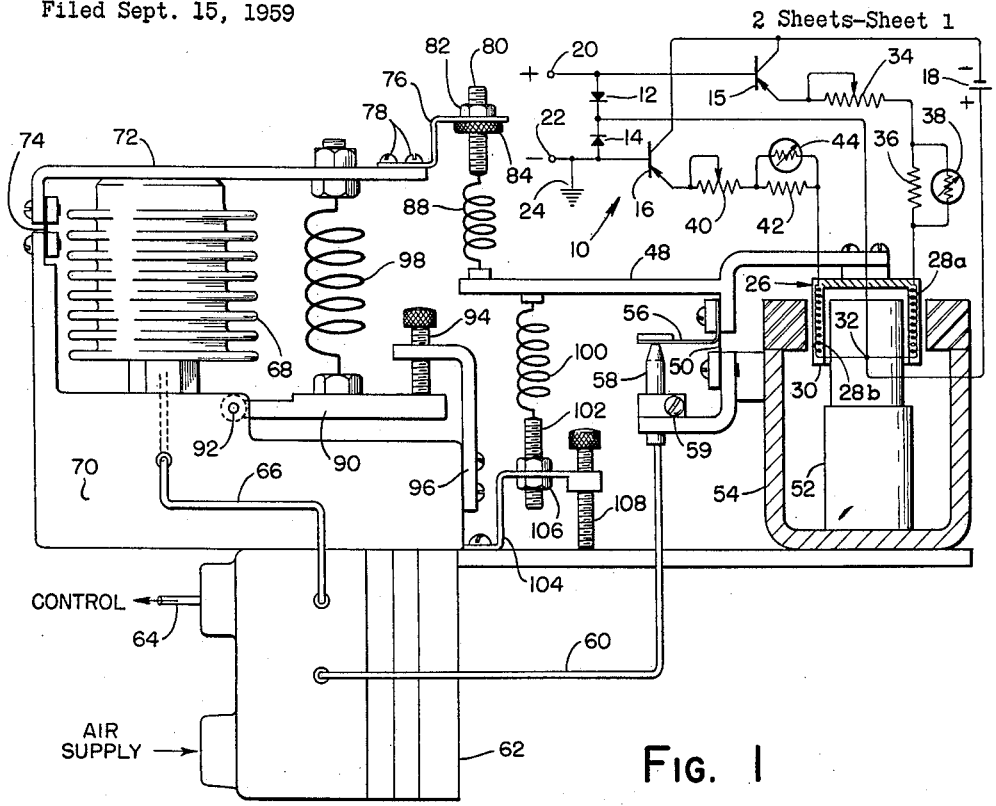

March 12, 1963    M. O. DUSTIN ETAL    3,080,878
ELECTRIC TO PNEUMATIC SIGNAL CONVERTING DEVICE
Filed Sept. 15, 1959    2 Sheets-Sheet 1

INVENTORS
MILES O. DUSTIN
AND JOHN C. MARTIN
BY John F. Luhrs
ATTORNEY

March 12, 1963  M. O. DUSTIN ETAL  3,080,878
ELECTRIC TO PNEUMATIC SIGNAL CONVERTING DEVICE
Filed Sept. 15, 1959  2 Sheets-Sheet 2

INVENTORS
MILES O. DUSTIN
AND JOHN C. MARTIN
BY
ATTORNEY

United States Patent Office 3,080,878
Patented Mar. 12, 1963

3,080,878
ELECTRIC TO PNEUMATIC SIGNAL CONVERTING DEVICE
Miles O. Dustin, Mentor, and John C. Martin, Wickliffe, Ohio, assignors to Bailey Meter Company, a corporation of Delaware
Filed Sept. 15, 1959, Ser. No. 840,175
14 Claims. (Cl. 137—85)

This invention relates to signal converting apparatus and more particularly to a device for converting an electrical signal to a proportional pneumatic signal.

Converting devices employing force balance or motion balance systems have in the past been utilized, the force balance system being generally preferred due to its more linear characteristics. In the most common arrangement an electric signal to be converted is applied to a coil movable in a magnetic field established by a permanent magnet structure. Displacement of the coil due to variations in the magnitude of the electrical signal is effective to produce an unbalancing force on a force balance beam. Displacement of this beam varies the spacing between a nozzle baffle pneumatic couple. A pneumatic amplifier responsive to the nozzle pressure establishes a pneumatic output pressure which is applied to a feedback or restoring bellows or other expansible element mounted in engagement with the force balance beam to apply a proportional restoring force thereto to balance the force of the movable coil.

Such force balance converting devices while capable of performing their intended function are subject to several disadvantages which in some instances limit their use. One disadvantage is the difference in relative magnitudes of the forces applied to the beam by the movable coil and restoring bellows. The force applied by the coil is very small while due to the output pneumatic signal ranges desired the restoring force established by the pneumatic amplifier and restoring bellows is very large. Accordingly it has been necessary to apply the force of the coil to the beam utilizing a large moment arm and to apply the restoring force utilizing a very small moment arm to achieve the proper stability and balance in the output signal ranges utilized. This physical requirement or limitation has resulted in large cumbersome structures which do not comply with the space limitations in many installations, thus limiting the use of the device.

Another disadvantage of the above described force balance converting device is the hunting or cyclical vibration of the beam which occurs in response to sudden variations in the input electric signal. Such operation results in temporary errors in the conversion.

Another limitation of such apparatus has been the difficulty of adjusting the range of the output pressure signal.

It is a principal object of this invention to provide an electric to pneumatic converter not subject to the above disadvantages and limitations.

Another object of the invention is to compensate for the differences in magnitude of the input and rebalancing forces on a force balance beam without the use of compensating moment arms.

Still another object of the invention is to utilize a spring connection between an expansible restoring element and a force balance beam.

Another object of the invention is to utilize a split input coil in an electric to pneumatic converter and adjustable resistors in series with the coil halves to adjust the output pneumatic signal range.

Figure 4:
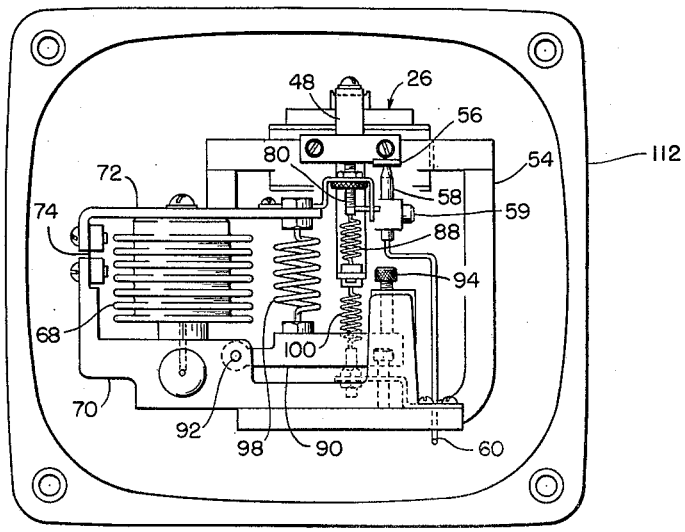
Figure 3:
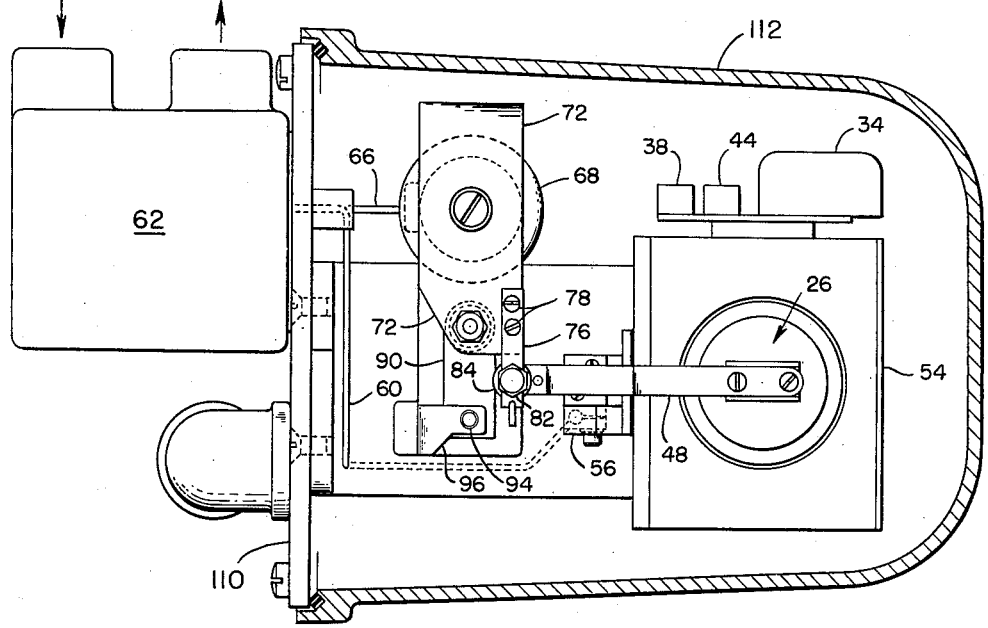
Figure 2:
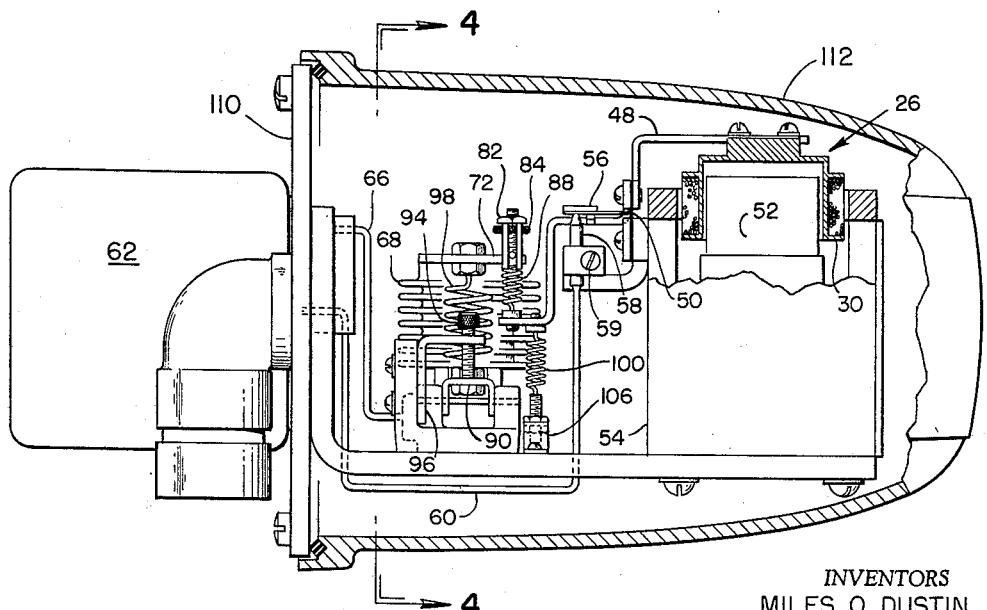

Other objects and advantages will become apparent from the following description taken in connection with the accompanying drawings wherein:

FIG. 1 is a schematic illustration of a converting device embodying this invention;
FIG. 2 is a longitudinal view in partial section of a commercial embodiment of the invention;
FIG. 3 is a top view of the device illustrated in FIG. 2; and
FIG. 4 is a section taken along the line 4—4 of FIG. 2.

Referring more particularly to FIG. 1 of the drawings, there is shown an amplifier 10 comprising a pair of diode rectifier elements 12 and 14, a pair of transistors 15 and 16, and a suitable source of direct voltage which for convenience we have shown as a battery 18. The amplifier 10 is provided with a pair of input terminals 20 and 22, one of which is grounded at 24 and the other which may be connected to a source of variable direct voltage (not shown) representative of a variable condition.

The amplifier 10 is effective to produce an amplified electrical signal which is utilized to vary the magnetic force of an electro magnetic means on magnetic coil assembly 26 comprising a winding 28 wound on a hollow cylindrical frame 30 and having separate winding halves 28a and 28b separated by a center tap 32.

The winding half 28a is electrically connected in series with an adjustable resistor 34 and a fixed resistor 36, shunted by a thermistor 38, between the center tap 32 and emitter electrode of the transistor 15. Similarly, the winding half 28b is connected electrically in series with an adjustable resistor 40 and a fixed resistor 42 shunted by a thermistor 44 between the center tape 32 and emitter electrode of transistor 16. To complete the amplifier circuit the collector electrodes of the transistors 15 and 16 are connected to the negative side of the source 18, the positive side of which is connected to the center tap 32. The input terminals 20 and 22 are electrically connected to the base electrodes of the transistors 15 and 16 respectively and electrically connected to the center tap 32 by diodes 12 and 14 respectively.

In operation of the amplifier circuit when a positive direct voltage signal is applied to input terminal 20, current will flow from terminal 20 through diode 12, winding 28b, resistors 40, 42, and through transistor 16 which is biased conductive to thus complete an energizing circuit for winding 28b. The diode 14 due to its polarity arrangement is in effect back-biased and non-conductive preventing energization of winding 28a.

When the direct voltage signal applied to terminal 20 is negative the diode 14 will be conductive to effect energization of winding half 28a in a similar manner, the diode 12 being in this case back-biased and non-conductive to prevent energization of winding half 28b. Thus, the amplifier circuit is responsive to a positive direct voltage signal to energize winding half 28b and a negative direct voltage signal to energize winding half 28a. It is to be noted that the electrical current flow through these windings will be in opposite directions and the magnetic fields established will be opposite in polarity.

As will later be described in more detail the resistor 36, thermistor 38, resistor 42 and thermistor 44 serve to compensate for variations in ambient temperature conditions while the resistors 34 and 40 are utilized to effect accurate calibration of the pneumatic output pressure range.

The movable coil assembly 26 is carried on one end of a force balance beam 48 which is pivoted at its medial portion by means of a flexure 50. As will later be described, a restoring force is applied to the other end of the beam 48 to balance the force established by the coil assembly 26.

The movable coil assembly 26 is movable over a magnetic pole 52 of a permanent magnet assembly 54. A current flow through winding half 28b is effective to establish a magnetic field which is opposed by the magnetic field established by the magnet 54, while a current flow through winding half 28a is effective to establish a magnetic field which is aided by the magnetic field of magnet 54. As a result a force is applied to the right hand end of the force balance beam 48 the direction and magnitude of which depends upon the particular winding half energized and the magnitude of the current flow therein.

The medial portion of the force balance beam 48 carries a baffle 56 which in cooperation with a nozzle 58 forms a fluid pressure couple. The nozzle 58 is adjustably fixed by means of screws 59 to a supporting bracket carried by the magnet assembly 54. The nozzle 58 is connected by a pipe 60 to a pneumatic amplifier 62.

In general, the amplifier 62 is supplied with air under pressure and is operative in response to a change in the spacing between the nozzle 58 and baffle 56 to produce a pressure output signal in conduit 64 which may be utilized for indicating and/or control purposes. This output signal pressure is also supplied by conduit 66 to an expansible bellows 68 which is effective to apply a restoring force to the beam 48.

The amplifier 62 may be of any suitable type which will produce a change in output pressure in response to a change in position of a fluid couple. For a suitable construction, reference is made to copending application Serial No. 652,477, filed April 12, 1957 by Bruce H. Baldridge, now Patent 2,974,674, which discloses an amplifier of the reset type suitable for use with the present device.

The restoring bellows 68 has one end mounted on a fixed support 70 and has its other movable end engaging a lever 72 which is pivoted at one end on the support 70 by means of a flexure 74. The other end of the lever 72 extends toward the force balance beam 48 in substantially parallel relationship therewith and carries an S shaped bracket 76 on the upper side thereof. The bracket 76 is fixed to the lever 72 by means of screws 78 and has a screw 80 of substantial length extending through the end thereof perpendicular to the force balance beam 48. A nut 82 is threaded on the upper end of the screw 80 into engagement with the upper surface of the bracket 76 while a second knurled nut 84 is threaded on the lower end of the screw 80 into engagement with the lower surface of the bracket 76. With this arrangement the axial position of the screw 80 may be adjusted as desired by adjustment of the nuts 82 and 84.

The lower end of the screw 80 is connected by a tension spring 88 to the left end of the force balance beam 48. The spring 88 serves to translate the motion of the lever 72 into a restoring force which balances the force applied to the other end of the beam 48. The screw 80 serves as a means for initially adjusting the parallel relationship of the lever 72 and force balance beam 48 as will later be described in more detail.

A second lever 90 is pivoted on the support 70 at 92 in parallel relationship with the lever 72 and force balance beam 48. The free end of the lever 90 engages the end of a screw 94 threaded in a bracket 96 also supported on the support 70. The medial portions of the levers 72 and 90 are connected by means of a coil spring 98 which establishes a biasing force on the lever 72 to determine the pneumatic output pressure signal range. Calibration is accomplished through adjustment of the screw 94 as will be hereinafter described in more detail.

An additional spring 100 is mounted in tension between the force balance beam 48 and a screw 102 which is adjustably supported on a flexible bracket 104 by means of nuts 106. One end of the bracket 104 is fixed to the support 70 while the other end thereof is adjustable against the inherent bias of the bracket 104 by means of screw 108 which is threaded through the end of the bracket 104 into engagement with the support 70.

To calibrate the converting device for operation, assume that it is desired to produce an output signal having a range of 3–27 p.s.i. in conduit 64 in response to an input electrical signal having a range of +25 to −25 volts. With zero input signal the springs 88 and 100 are adjusted by means of screws 80 and 102 respectively until both springs are in tension and the coil assembly 26 in a center position with respect to magnet 54. The position of the nozzle 58 is adjusted by means of screw 59 until a 15 p.s.i. output in conduit 64 is obtained, and the screw 94 is adjusted to vary the biasing force of spring 98 until the lever 72 is parallel to the beam 48. These adjustments are repeated as necessary until lever 72 and beam 48 are parallel at the 15 p.s.i. condition.

Following the above adjustments a signal of +25 volts is applied to the input terminals of amplifier 10. Upward movement of the coil assembly 26 will occur effecting relative movement of the nozzle 58 and baffle 56 until the signal pressure in conduit 64 increases sufficiently to establish a restoring force on force balance beam 48 by means of spring 88, lever 72, and bellows 68. The beam 48 will then be restored to its original position and the output pressure in conduit 64 should be at the upper end of its range or 27 p.s.i. If this condition does not exist the resistor 40 is adjusted to vary the current in winding half 28b until a 27 p.s.i. output pressure is achieved with the +25 volt input. Similarly, a signal of −25 volts is applied to the input terminals of amplifier 10 and the resistor 34 is adjusted if necessary to produce an output pressure of 3 p.s.i.

After the above adjustments have been made, the output pressure will be 27 p.s.i. when the input is +25 volts, 15 p.s.i. when the input is zero volts, and 3 p.s.i. when the input is −25 volts.

In operation of the device assume that the input signal is constant at zero volts producing an output pressure of 15 p.s.i. As previously mentioned at this condition the lever 72 and beam 48 will be parallel, and the coil assembly 26 will be at the mid point of its vertical path. If the input signal should increase in a positive direction, the current flow through winding half 28b will increase, increasing the magnet force of the coil assembly 26 in opposition to the magnetc force of the magnet 54. As a result upward movement of the coil assembly 26 will occur causing counterclockwise pivotal displacement of the force balance beam 48 and movement of the baffle 56 toward the nozzle 58 to increase the nozzle pressure in conduit 60. The amplifier 62 will sense the increased pressure in conduit 60 to produce an increased output signal pressure in conduit 64. Expansion of the bellows 68 will occur in response to the increased signal pressure to effect upward pivotal movement of the lever 72 against the bias of springs 88 and 98. The tension of spring 88 will increase to apply an increased upward force on the left end of the beam 48. The output signal pressure in conduit 66 will continue to increase until sufficient upward displacement of the lever 72 has occurred to effect balance of the beam 48 by the increased bias of the spring 88. When this condition is reached the output pneumatic pressure will remain constant and the force balance beam 48 will be restored to its original position as shown in FIG. 1.

If an increase in the input signal should occur in a negative direction from the original zero input condition, energization of winding 28a will effect displacement of the force balance beam 48 in a clockwise direction and a decrease in the nozzle pressure in conduit 60. As a result the output pressure in conduit 66 will decrease and the lever 72 will be displaced downward from the level position illustrated in FIG. 1 until force balance beam 48 is restored to the original position.

It will be apparent that the output range of the pneumatic pressure may be varied as desired through substitution of springs of different strength for spring 98.

The thermistors 38 and 44 in combination with their associated resistors 36 and 42 respectively serve to establish variable voltage drops in their associated circuits to compensate for variations in current flow through windings 28a and 28b due to variations in ambient temperature conditions. As a result the device is substantially unaffected by ambient temperature variations.

The spring 100 being mounted in tension in opposition to the spring 88 provides a stabilizing action in addition to a means for adjusting the balanced position of the beam 48.

The important features of the converting device will now be apparent. One of the most important features is the polarity controlled amplifier circuit 10 which enables a signal variable through a positive and negative range to be converted to a pressure signal. The diodes 12 and 14 effective to direct current flow to the proper transistor accomplish selective energization of the winding halves 28a and 28b to effect polarity sensitive operation of the system. This operation is facilitated by the use of a temperature compensated split winding on the coil assembly having a common terminal or center tap which establishes a common energizing circuit.

Another important feature of the invention is the particular construction of the force balance mechanism wherein the restoring force is applied by varying the tension in spring 88. This method of establishing a restoring force eliminates vibration or hunting of the force balance beam resulting in high stability and accurate signal conversion. This stability in increased by the use of spring 100 which acts in opposition to the spring 88 and also serves as an adjustment means.

Also, due to the spring connection between the lever 72 and beam 48, the large force of the bellows 68 is substantially overcome in displacement of lever 72 against the bias of spring 98 eliminating the need for a high ratio of moment arms as hereinbefore discussed in connection with prior art devices. In effect the expansive force of the bellows 68 is absorbed in motion of lever 72 and a restoring force is applied to the force balance beam proportional to the movement.

FIGS. 2, 3 and 4 of the drawings illustrate an actual commercial embodiment of the invention. Parts similar to those in FIG. 1 have been given like reference numerals for purposes of clarity. The parts of the commercial embodiment have substantially the same configuration and function as the equivalent parts shown in FIG. 1, and therefore, a detailed description is not deemed necessary. The only substantial difference resides in the arrangement of the levers 48 and 72 at right angles to each other in the commercial structure. Additionally, the support 70 is provided by a casing 110 on which the parts are mounted and enclosed by a suitable cover 112.

While only one embodiment of the invention has been herein shown and described, it will be apparent to those skilled in the art that many changes may be made in the construction and arrangement of parts without departing from the scope of the invention as defined in the appended claims.

What we claim as new and desire to secure by Letters Patent of the United States is:

1. In an electric to pneumatic signal converting device, the combination comprising, a casing, a force balance beam pivotally mounted on said casing intermediate the ends thereof, electro-magnetic means responsive to a variable electrical signal for applying a force to one end of said beam proportional to the magnitude of the electrical signal to effect displacement of said beam, means including a fluid pressure couple associated with said beam responsive to displacement of said beam to establish a pneumatic output pressure signal, an expansible bellows member having one end fixed to said casing and the other end thereof movable in response to variations in said output pressure signal, a lever pivotally mounted on one end on said casing and having its medial portion in engagement with said movable end of said bellows member, a first spring adjustably connected between the other end of said lever and the other end of said force balance beam, a second spring having one end fixed to said lever, a second lever pivotally mounted on said casing having the medial portion thereof connected to the other end of said second spring, means for adjusting the position of said second lever to vary the biasing force of said second spring, an adjustable support mounted on said casing, and a third spring having one end fixed to said other end of said force balance beam and its other end connected to said adjustable support, said first, second and third springs and said bellows member being positioned in parallel axial relationship.

2. In an electric to pneumatic signal converting device, the combination comprising, a casing, a force balance beam pivoted on said casing intermediate the ends thereof, a permanent magnet mounted on said casing adjacent one end of said beam, an electric coil assembly carried on one end of said beam adjacent said permanent magnet to produce a magnetic force acting on said beam to effect displacement of the same, said coil assembly comprising a winding having a center tap defining separate winding halves, a polarity sensitive amplifier operative to effect selective energization of said winding halves according to the magnitude and polarity of a variable electrical signal to control the direction and magnitude of the force acting on said beam, means responsive to displacement of said beam for establishing a pneumatic signal pressure, and means responsive to said signal pressure for applying a restoring force to said force balance beam.

3. An electric to pneumatic signal converting device as claimed in claim 2 wherein said winding is wound on a cylindrical frame and is fitted over a cylindrical pole of said permanent magnet.

4. An electric to pneumatic signal converting device as claimed in claim 3 wherein an adjustable resistance is connected in series with each of said winding halves for adjusting the output pressure signal.

5. An electric to pneumatic signal converting device as claimed in claim 4 wherein a resistor is connected in a parallel circuit with a thermistor in series with each of said winding halves to compensate for the effect of variations in ambient temperature.

6. An electric to pneumatic signal converting device as claimed in claim 4 wherein an additional spring is connected between said other end of said force balance beam and said casing in tension.

7. An electric to pneumatic signal converting device as claimed in claim 3 wherein said signal pressure responsive means comprises an expansible bellows member, a pivoted lever engaged by said bellows member, and a spring connected in tension between said lever and said force balance beam.

8. In an electric to pneumatic signal converting device, the combination comprising, a casing, a force balance beam pivotally mounted on said casing intermediate the ends thereof, electromagnetic means responsive to a variable electrical signal for applying a force to one end of said beam proportional to the magnitude of the electrical signal to effect displacement of said beam, means including a fluid pressure couple associated with said beam responsive to displacement thereof to establish a pneumatic output pressure signal, an expansible element responsive to said output pressure signal having a movable end wall movable in response to variations in the magnitude of said output pressure signal, a lever pivoted at one end of said casing and engaged by said movable end wall, said lever being positioned in substantially parallel relationship with said force balance beam, a coil spring connecting the other end of said lever and the other end of said force balance beam to apply a restoring force to said force balance beam proportional to the position of said movable end wall, and a second spring having one end fixed to the medial portion of said lever and the other end thereof adjustably mounted on said casing to determine the range of said output pressure signal.

9. In an electric to pneumatic signal converting device as claimed in claim 8 wherein a third spring is connected between said other end of said force balance beam and an adjustable support mounted on said casing.

10. In a control device, the combination comprising, a casing, a force balance beam pivotally mounted on said casing, means for applying a force to said beam proportional to the magnitude of a variable condition to effect displacement of said beam, means responsive to displacement of said beam for establishing an output signal, a lever pivotally mounted on said casing, means responsive to said output signal engaging said lever for pivoting the same relative to said casing, a coil spring mounted in tension between said lever and one side of one end of said force balance beam to apply a restoring force to said force balance beam proportional to the position of said lever, and an adjustable second coil spring mounted in tension between the other side of said one end of said force balance beam and said casing to provide both a positioning adjustment for said force balance beam and a stabilizing force thereon proportional to the position thereof.

11. In a control device, the combination comprising, a casing, a force balance beam pivotally mounted on said casing, means for applying a force to said beam proportional to the magnitude of a variable condition to effect displacement of said beam, means responsive to displacement of said beam for establishing an output signal, a lever pivotally mounted on said casing, means responsive to said output signal engaging said lever for pivoting the same relative to said casing, a coil spring mounted in tension between said lever and said beam to apply a restoring force to said beam proportional to the position of said lever, and a coil spring adjustably mounted in tension between said lever and said casing for biasing said lever into engagement with said expansible element to determine the range of said output signal.

12. In a control device, the combination comprising, a casing, a force balance beam pivotally mounted on said casing intermediate the ends thereof, means for applying a force to one end of said beam proportional to the magnitude of a variable condition to effect displacement of said beam, means responsive to displacement of said beam for establishing an output pressure signal, a lever pivotally mounted on said casing, an expansible element responsive to said output pressure signal engaging said lever to effect pivotal movement of the same in response to changes in said pressure signal, a coil spring mounted in tension between said lever and one side of said beam at the other end therefor for applying a restoring force to said beam proportional to the position of said lever, a second coil spring mounted in tension between the other side of said beam and said casing at said other end thereof to stabilize said beam, and a third coil spring adjustably mounted in tension between said lever and said casing for biasing said lever into engagement with said pressure sensitive element and to determine the range of said output signal.

13. A polarity sensitive amplifier circuit for selectively controlling energization of an electric coil assembly from a source of direct voltage of variable magnitude and polarity to render the magnitude and direction of the magnetic field of the coil assembly dependent on the magnitude and polarity of the direct voltage source comprising, a pair of input terminals, a coil assembly comprising a winding having a center tap dividing said winding into two winding halves, a pair of diode rectifier elements connected directly across the input terminals in series opposition and having a common junction connected to said center tap, one of said diodes being conductive when a positive direct voltage is applied to said input terminals and the other diode being conductive when a negative direct voltage is applied to said input terminals, a transistor connected in an electric circuit with each of said winding halves and one of said input terminals, and a source of bias voltage for said transistors for biasing said transistors to effect completion of an energizing circuit for one of said winding halves through one of said transistors when the direct voltage source is positive and said one diode is conductive and to effect completion of an energizing circuit for the other of said winding halves through the other of said transistors when the direct voltage source is negative and said other diode is conductive.

14. In an electric to pneumatic signal converting device, the combination comprising, a casing, a pivotal beam mounted on said casing for pivotal displacement relative thereto, means responsive to displacement of said beam for establishing an output pneumatic signal, electro-magnetic means for applying a magnetic force to said beam to effect displacement thereof including a winding having a center tap establishing separate winding halves, a pair of input terminals to which a variable direct voltage signal is applied, a pair of diode rectifier elements connected across said input terminals in series opposition and having a common junction connected to said center tap, one of said diodes being conductive when a positive direct voltage is applied to said input terminals and the other diode being conductive when a negative direct voltage is applied to said input terminals, a pair of transistors each connected in an electric circuit with one of said winding halves and one of said input terminals, and a source of bias voltage for said transistors for biasing said transistors to effect completion of an energizing circuit for each of said winding halves through its associated transistor when its associate diode element is conductive.

References Cited in the file of this patent

UNITED STATES PATENTS

| | | |
|---|---|---|
| 1,638,101 | Roucka et al. | Aug. 9, 1927 |
| 2,096,931 | Willing | Oct. 26, 1937 |
| 2,408,685 | Rosenberger | Oct. 1, 1946 |
| 2,443,891 | Buerschaper | June 22, 1948 |
| 2,598,258 | Hoffman | May 27, 1952 |
| 2,601,867 | Alyea | July 1, 1952 |
| 2,670,464 | Wuensch et al. | Feb. 23, 1954 |
| 2,742,916 | Side | Apr. 24, 1956 |
| 2,812,393 | Patrick | Nov. 5, 1957 |
| 2,838,028 | Erbguth | June 10, 1958 |
| 2,842,147 | Markson | July 8, 1958 |
| 2,859,402 | Schaeve | Nov. 4, 1958 |
| 2,866,925 | Wunderman | Dec. 30, 1958 |
| 2,874,339 | Perlman | Feb. 17, 1959 |
| 2,907,932 | Patchell | Oct. 6, 1959 |
| 2,924,778 | Barton | Feb. 9, 1960 |
| 2,927,593 | Hall et al. | Mar. 8, 1960 |
| 2,985,182 | Williams | May 23, 1961 |
| 2,986,151 | Shannon | May 30, 1961 |
| 3,008,480 | Fleming et al. | Nov. 14, 1961 |